United States Patent [19]

Shinozaki et al.

[11] Patent Number: 4,762,630

[45] Date of Patent: Aug. 9, 1988

[54] ELECTROLYTE FOR ELECTROLYTIC CAPACITOR

[75] Inventors: Fumihiko Shinozaki; Tatsunori Tsuji; Yutaka Yokoyama, all of Ome, Japan

[73] Assignee: Nippon Chemi-Con Corporation, Tokyo, Japan

[21] Appl. No.: 29,638

[22] Filed: Mar. 24, 1987

[30] Foreign Application Priority Data

Mar. 28, 1986 [JP] Japan ................................. 61-70307

[51] Int. Cl.[4] .............................................. H01G 9/00
[52] U.S. Cl. ...................................... 252/622; 361/433
[58] Field of Search ..................... 252/62.2; 361/433 E

[56] References Cited

U.S. PATENT DOCUMENTS

| | | | |
|---|---|---|---|
| 4,189,761 | 2/1980 | Finkelstein | 252/62.2 |
| 4,559,581 | 12/1985 | Eijkelenkamp et al. | 252/62.2 |
| 4,664,830 | 5/1987 | Shinozaki et al. | 252/62.2 |

Primary Examiner—John F. Niebling
Assistant Examiner—Kathryn Rubino

[57] ABSTRACT

An electrolyte for an electrolytic capacitor is disclosed containing an alkyl quarternary ammino salt of an aliphatic saturated monocarboxylic acid as solute within an aprotic solvent. The electrolyte exhibits high conductivity while eliminating the drawbacks associated with the presence of water.

4 Claims, No Drawings

ELECTROLYTE FOR ELECTROLYTIC CAPACITOR

FIELD OF THE INVENTION

An electrolyte for an electrolytic capacitor containing within an aprotic solvent an alkyl quarternary ammonium salt of aliphatic saturated monocarboxylic acid as as solute.

An electrolyte for an electrolytic capacitor according to the invention may conveniently be prepared by adding one equivalent amount of aliphatic saturated monocarboxylic acid to a methylene chloride solution of alkyl ammonium hydrogen-sulfate for reaction with subsequent addition of two equivalent amounts of alkali hydroxide. A deposit is removed from the reaction product with subsequent vacuum drying to obtain an anhydrous salt and then dissolving said anhydrous salt to an aprotic solvent until a desired conductivity is obtained, for example, as an approximately 10% by weight solution.

BACKGROUND OF THE INVENTION

An electrolytic capacitor is composed by using an anode electrode of the so-called valve metal such as aluminum or tantalum, said metal being caused to form an insulating oxide layer on its surface, said insulating oxide layer acting as a dielectric layer, contacting said insulating oxide layer with an electrolyte layer, arranging a current collector electrode generally referred to as cathode.

The electrolyte for the electrolytic capacitor, as above mentioned, contacts directly with the dielectric layer and acts as a true cathode, that is, the electrolyte lies between the dielectric layer of the electrolytic capacitor and the current collector electrode and hence its resistance is inserted in series for the electrolytic capacitor. Therefore, the characteristic of the electrolyte results in an important factor controlling the characteristic of the electrolytic capacitor. For example, if a conductivity of an electrolyte is lower, an equivalent series resistance within an electrolytic capacitor is increased and hence a high-frequency characteristic and a loss characteristic may be lowered.

That is the reason of the demand for high conductivity electrolyte and as such a high conductivity electrolyte, a solution of an inorganic acid, an organic acid or their salts in a proton accepting solvent, such as glycols or alcohols have been known. Especially, organic carboxylic acids have been used as salt of ammonium or primary, secondary or tertiary amine.

The latest expansion in demand for electrolytic capacitors having higher electric characteristics has not been satisfied with the conductivity of the presently available electrolyte. Especially in the case of the presently available electrolyte, when a desired conductivity is not obtained or a low solubility solute is used, the conductivity has been improved by intentially adding water.

However, in the latest utilizing condition of the electrolytic capacitor required for use at above 100° C. and for many hours, the presence of water causes a dielectric layer to be worsened, an internal vapor pressure of the electrolytic capacitor to be increased, and hence, the life of the electrolytic capacitor is worsened because of a breakage of a seal part or a volatilization of an electrolyte. Therefore, the presently available electrolytic capacitor has had as a drawback the inability to hold a stable characteristic over a long term. To solve the matter, it is known that ammonium formate is used as a solute as disclosed in the Japanese patent publication No. 54-1023; ammonium propionate is used as a solute as disclosed in the Japanese patent publication No. 53-138047. However, when organic monocarboxylic acid salts of ammonium, primary or secondary amine are dissolved in a proton accepting solvent, an esterification or an amidification is caused at high temperature and such an ester or an amine does not remain in an ionic state and does not contribute to a conductivity and hence a high conductivity is not obtained. Further, even if an aprotic solvent is used, the same deterioration is caused by an amidification, and hence, a necessary characteristic of an electrolytic capacitor has not been obtained. Furthermore, when an organic monocarboxylic acid salt of a tertiary amine is used, such as the case of triethyl amine formate (the Japanese patent publication No. 52-45905), a deterioration due to an esterification is also caused in a proton accepting solvent. In this case, an esterification or amidification as mentioned above is not caused in an aprotic solvent. However, as to the conductivity, the requirement for the latest electrolytic capacitor has not been met.

It has been discovered that an alkyl ammonium salt of an aliphatic monocarboxylic acid has no such deterioration in an aprotic solvent as mentioned above, and the solution has an extremely high conductivity. Further, the alkyl ammonium salt of an aliphatic monocarboxylic acid may be used for a mixed solvent of an aprotic solvent and a proton accepting solvent such as ethylene glycol almost without the deterioration of the electrolytic capacitor during the characteristic life time. This may occur because the conventional ammonium salt or primary, secondary or tertiary amine salt dehydrates a proton accepting solvent. However, the alkyl ammonium salt of the invention removes alcohol, and the rate of the dealcohol reaction is extremely slow as compared with the rate of the dehydration reaction.

SUMMARY OF THE INVENTION

Thus, a principal object of the invention is to provide an electrolyte of substantially non water series high conductivity with use of the aprotic solvent.

An electrolyte for electrolytic capacitor according to the invention is characterized by containing an alkyl quaternary ammonium salt of aliphatic saturated monocarboxylic acid in the aprotic solvent as solute.

PREFERRED EMBODIMENTS OF THE INVENTION

The alkyl ammonium salt of an aliphatic saturated monocarboxylic acid according to the invention is represented by the general formula,

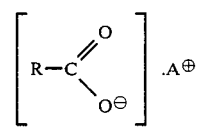

in which R is hydrogen atom or straight or branched chain alkyl group having 1 to 6 carbon atoms and A is alkyl ammonium comprising 1 to 4 alkyl groups having 1 to 6 carbon atoms.

The aliphatic saturated monocarboxylic acid to be preferably used in the invention may be selected from the group of formic acid, acetic acid, propionic acid, n-butyric acid, iso-butyric acid, valeric acid [$CH_3(CH_2)_3CO_2H$], isovaleric acid [$(CH_3)_2CHCH_2CO_2H$], 2-methylbutanoic acid [$CH_3CH_2CH(CH_3)CO_2H$], 2,2-dimethylpropanoic acid [$(CH_3)_3CCO_2H$], caproic acid [$CH_3(CH_2)_4CO_2H$] or heptanoic acid [$CH_3(CH_2)_5CO_2H$].

The alkyl ammonium to be preferably used in the invention may be selected from the following but not limited thereto:

tetramethylammonium, tetraethylammonium, tetrabutylammonium, trimethylammonium, dihexylammonium, hexylammonium.

The aprotic solvent to be used in the invention may be selected from the following but not limited thereto:

(1) Amide system solvent:

N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphorinamide (2) Oxide compounds:
dimethyl sulfoxide
(3) Nitrile compounds:
acetonitrile
(4) Cyclic esters, cyclic amides:
γ-butyrolactone, N-methyl-2-pyrrolidone, ethylene carbonate, propylene carbonate.

An electrolyte for an electrolytic capacitor according to the invention may conveniently be prepared by adding one equivalent amount of aliphatic saturated monocarboxylic acid to a methylene chloride solution of alkyl ammonium hydrogensulfate for reaction with subsequent addition of two equivalent amounts of alkali hydroxide. A deposit is removed from the reaction product with subsequent vacuum drying to obtain an anhydrous salt and then dissolving said anhydrous salt to an aprotic solvent until a desired conductivity is obtained.

An electrolyte for an electrolytic capacitor according to the invention will be exemplified in the following.

(EXAMPLE 1 AND COMPARATIVE EXAMPLE 1)

Tetraethylammonium formate is dissolved at various concentrations in N,N-dimethylformamide. The conductivities thereof are shown in Table 1.

Further, as the comparative example, the conventional electrolyte composed of triethanolamin-formic acid system at various concentrations is also shown in Table 1.

TABLE 1

| Tetraethylammonium formate Weight % | Formic acid Weight % | Conductivity ms/cm |
|---|---|---|
| Example 1 | | |
| 5 | 1.3 | 8.3 |
| 10 | 2.6 | 14.1 |
| 15 | 3.9 | 19.2 |
| 20 | 5.1 | 23.8 |
| 25 | 6.4 | 27.8 |
| Comparative Example 1 | | |
| 80 | 20 | 4.0 |
| 70 | 30 | 8.0 |
| 60 | 40 | 12.5 |
| 55 | 45 | 13.3 |
| 45 | 55 | 20.0 |

As understandable from the result above, an exceedingly low concentration of formic acid of Example 1 gives a high conductivity as compared with that of formic acid of Comparative example 1.

(EXAMPLES 2 TO 8)

An electrolyte for an electrolytic capacitor according to the invention will be exemplified in the following with 10% to 20% by weight solution for alkyl ammonium salts of various aliphatic saturated monocarboxylic acids with respect to the conductivity as shown in Table 2.

Further, as a comparative example the conventional standard electrolytes composed of 78% by weight of ethylene glycol, 10% by weight of water and 12% by weight of ammonium adipate are shown also in Table 2.

TABLE 2

| Example | Formulation of electrolyte | Weight (%) | Conductivity (ms/cm) |
|---|---|---|---|
| 2 | tetrabutylammoniumformate | 10 | 7.1 |
| | 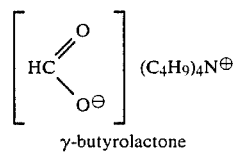 | | |
| | γ-butyrolactone | 90 | |
| 3 | tetraethylammoniumacetate | 10 | 14.1 |
| | 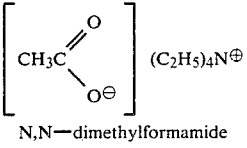 | | |
| | N,N—dimethylformamide | 90 | |
| 4 | tetrametylammoniumpropionate | 10 | 21.8 |
| | 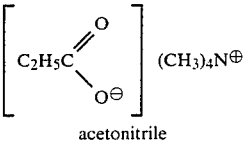 | | |
| | acetonitrile | 90 | |
| 5 | tetrabutylammoniumbutyrate | 20 | 11.2 |
| | 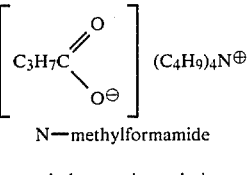 | | |
| | N—methylformamide | 80 | |
| 6 | tetraethylammoniumvalerianate | 20 | 9.1 |
| | 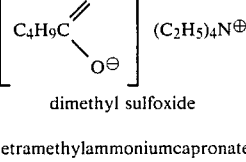 | | |
| | dimethyl sulfoxide | 80 | |
| 7 | tetramethylammoniumcapronate | 20 | 7.4 |
| | 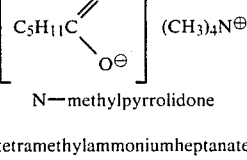 | | |
| | N—methylpyrrolidone | 80 | |
| 8 | tetramethylammoniumheptanate | 20 | 7.2 |

TABLE 2-continued

| Example | Formulation of electrolyte | Weight (%) | Conductivity (ms/cm) |
|---|---|---|---|
| | 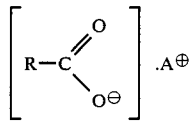 | | |
| | propylene carbonate | 80 | |
| Ref. | ethylene glycol | 78 | 6.7 |
| | water | 10 | |
| | ammonium adipate | 12 | |

As understandable from the result above, the electrolyte of the present invention has higher conductivity than that of the conventional electrolyte.

Further, a series of electrolytic capacitors for comparative test are prepared with the electrolytes of examples and each of the capacitor characteristics is compared.

The electrolytic capacitor for the test is prepared by rolling three layers superposed a cathode and an anode of aluminium foil and a separator paper between them to form a cylindrical capacitor element. The capacitor element is impregnated with each of electrolytes of the examples and then is introduced into an external case and sealed respectively.

Each electrolytic capacitor consists of the same dimentional capacitor element having 16 V rated voltage and 180 μF. rated capacity.

The actual high-temperature load test obtained at 16 WV 180 micro F for electrolytes exemplified in examples 2 to 8 and the comparative example are shown at the mean value of 10 load tests in Table 3.

TABLE 3

| | Initial Value | | | 110 deg. C. 1000 hours | | |
|---|---|---|---|---|---|---|
| Example | Capacity μF | tan δ | Leakage Current μA | Capacity μF | tan δ | Leakage Current μA |
| 2 | 178 | 0.075 | 0.56 | 172 | 0.077 | 0.52 |
| 3 | 180 | 0.061 | 0.54 | 175 | 0.068 | 0.49 |
| 4 | 183 | 0.039 | 0.54 | 165 | 0.047 | 0.49 |
| 5 | 180 | 0.068 | 0.51 | 176 | 0.069 | 0.47 |
| 6 | 178 | 0.075 | 0.60 | 169 | 0.083 | 0.57 |
| 7 | 178 | 0.079 | 0.55 | 156 | 0.095 | 0.50 |
| 8 | 178 | 0.080 | 0.61 | 155 | 0.100 | 0.55 |
| Ref. | 177 | 0.086 | 0.75 | 151 | 0.130 | 0.72 |

As understandable from the result above, the electrolytic capacitor using the electrolyte of the present invention has the lower capacitor losses or tan δ as compared with that of the conventional electrolyte because of the higher conductivity of the electrolyte of the present invention.

Furthermore, as the result of the essentially nonaqueous system, the electrolytic capacitor using the electrolyte of the present invention shows no abnormal exterior or decrease of the electrostatic capacity due to the increase of the internal pressure and the extremely few change of the characteristic values in comparison of the initial value with the value after the load test.

The electrolyte according to the invention may provide the electrolytic capacitor for the power device such as the switching regulator used at high frequency and requiring high efficiency and for various electrical machineries and apparatuses used at high temperature for a long term because of the maintenances of the lower capacitor losses and the stable characteristic used at high temperature for a long term.

What is claimed is:

1. An electrolyte for an electrolytic capacitor comprising an aprotic solvent and an alkyl ammonium salt of an aliphatic saturated monocarboxylic acid of general formula, $$\left[ R-C \begin{array}{c} \diagup O \\ \diagdown O^{\ominus} \end{array} \right] . A^{\oplus}$$

in which R is hydrogen atom or straight or branched chain alkyl group having 1 to 6 carbon atoms and A is alkyl ammonium comprising 1 to 4 alkyl groups having 1 to 6 carbon atoms.

2. An electrolyte for an electrolytic capacitor according to claim 1, wherein the aprotic solvent is selected from the group of N-methylformamide, N,N-dimethylformamide, N-ethylformamide, N,N-diethylformamide, N-methylacetamide, N,N-dimethylacetamide, N-ethylacetamide, N,N-diethylacetamide, γ-butyrolactone, N-methyl-2-pyrrolidone, ethylene carbonate, propylene carbonate, dimethyl sulfoxide, acetonitrile or the mixture thereof.

3. An electrolyte for an electrolytic capacitor according to claim 1, wherein the an aliphatic saturated monocarboxylic acid is selected from the group of formic acid, acetic acid, propionic acid, n-butyric acid, isobutyric acid, valeric acid, isovaleric acid, 2-methylbutanoic acid, 2,2-dimethylpropanoic acid, caproic acid or heptanoic acid.

4. An electrolyte for an electrolytic capacitor according to claim 1, wherein the alkyl ammonium is selected from the group of tetramethylammonium, tetraethylammonium, tetrabutylammonium, trimethylammonium, dihexylammonium, hexylammonium.

* * * * *